United States Patent
Donath et al.

(10) Patent No.: US 10,283,957 B2
(45) Date of Patent: May 7, 2019

(54) SUPPLYING LOAD HAVING INRUSH-CURRENT BEHAVIOUR

(71) Applicant: Infineon Technologies AG, Neubiberg (DE)

(72) Inventors: Stephan Donath, Unterhaching (DE); Veli Kartal, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 227 days.

(21) Appl. No.: 15/252,047

(22) Filed: Aug. 30, 2016

(65) Prior Publication Data
US 2017/0063077 A1 Mar. 2, 2017

(30) Foreign Application Priority Data
Aug. 31, 2015 (DE) .................. 10 2015 114 460

(51) Int. Cl.
| H02H 9/00 | (2006.01) |
| H02H 9/02 | (2006.01) |
| H02J 7/00 | (2006.01) |
| H02J 7/34 | (2006.01) |
| H02M 3/156 | (2006.01) |

(52) U.S. Cl.
CPC ............ *H02H 9/002* (2013.01); *H02H 9/025* (2013.01); *H02J 7/0052* (2013.01); *H02J 7/345* (2013.01); *H02M 3/156* (2013.01)

(58) Field of Classification Search
CPC ....... H02H 9/002; H02H 9/025; H02J 7/0052; H02J 7/345; H02M 3/156
USPC ........................................................ 307/35
See application file for complete search history.

(56) References Cited

U.S. PATENT DOCUMENTS

| 7,253,540 B1 | 8/2007 | Thalheim et al. |
| 8,680,893 B2 * | 3/2014 | Spalding, Jr. ...... H03K 17/0822 323/272 |
| 2015/0016005 A1 * | 1/2015 | Simonson .............. H02H 9/025 361/93.9 |

FOREIGN PATENT DOCUMENTS

EP     1266454 B1     10/2003

* cited by examiner

*Primary Examiner* — Hal Kaplan
*Assistant Examiner* — Toan Vu
(74) *Attorney, Agent, or Firm* — Slater Matsil, LLP

(57) ABSTRACT

Devices and methods are provided relating to supplying a load having an inrush-current behavior, e.g. charging of a capacitance e.g. at power up of a circuit. A first load path and a second load path are provided which are used in an alternating manner.

19 Claims, 5 Drawing Sheets

SUPPLYING LOAD HAVING INRUSH-CURRENT BEHAVIOUR

CROSS-REFERENCE TO RELATED APPLICATIONS

This application claims priority to and the benefit of German Patent Application No. 10 2015 114 460.3, filed on Aug. 31, 2015, which application is hereby incorporated herein by reference in its entirety.

TECHNICAL FIELD

The present application relates to methods and devices for supplying loads having an inrush-current behavior, for example for charging capacitors, for example capacitors included in loads to be supplied by a power supply.

BACKGROUND

When power is switched on a system comprising one or more capacitors, these capacitors, until charged have a comparably low ohmic resistance leading to high currents, also referred to as inrush currents. Such capacitors may include discrete capacitors, capacitors in an integrated circuit or parasitic capacitances. A similar effect may occur for example when switching on a light bulb. While a filament of the light bulb is still cold, it has a very low resistance leading to a high inrush current. Only when the filament is heated sufficiently by a supplied current, the resistance increases. Various approaches have been used to deal with this problem and to limit the inrush current, for example to prevent overheating and possible damage of components and devices used. However, conventional approaches have various drawbacks. For example, in some approaches a current limitation is used where a single MOSFET (metal oxide semiconductor field effect transistor) used as power switch is operated in a saturation region. Such an approach may be difficult with more recent MOSFET technologies due to various properties of the MOSFETs. In other approaches, a resistor is used to limit the current. In such an approach, usually a further switch is needed to bypass the resistor in normal operation. In some implementations, an area needed for such a resistor and costs associated therewith may be comparatively high.

Various approaches regarding limitation of such an inrush current are discussed in U.S. Pat. Nos. 6,225,797 B1; 7,787,271 B2; EP 0 569 883 A2; EP 2 398 146 A2 or WO 00/21176 A1.

It is therefore an object to provide improved possibilities for supplying loads having an inrush-current behavior as discussed above, for example for charging a capacitor or supplying a light bulb.

SUMMARY

A device as defined in claim 1 or 11 is provided. Furthermore, a method as defined in claim 14 is provided. The dependent claims define further embodiments.

DETAILED DESCRIPTION OF ILLUSTRATIVE EMBODIMENTS

Figure 1:
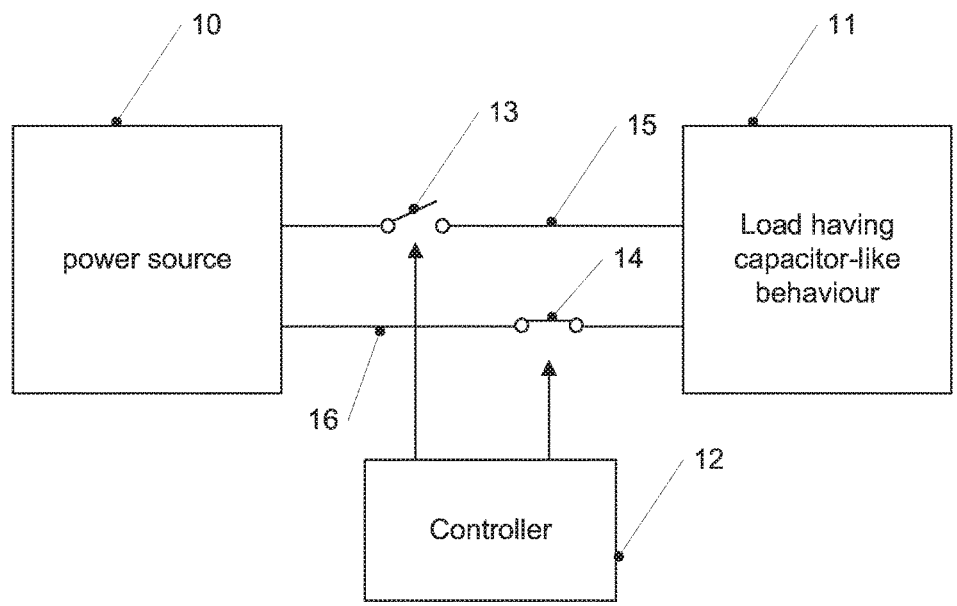
FIG. 1 is a schematic block diagram illustrating an embodiment.

In the following, various embodiments will be described in detail referring to the attached drawings. These embodiments are to be seen as examples only and are not to be construed as limiting. For example, while embodiments may be described as comprising a plurality of features or elements, this is not to be construed as indicating that all these features are necessary for an implementation. Instead, in other embodiments, some of these features or elements may be omitted and/or may be replaced by alternative features or elements. Also, additional features or elements to the ones explicitly described and shown may be provided, for example conventional features or elements of semiconductor devices, as the following description focuses on those features or elements necessary for understanding various implementations.

Features from different embodiments may be combined to form further embodiments. Variations or modifications described with respect to one of the embodiments may also be applicable to other embodiments.

Any direct connection or coupling between elements or components shown in the drawings or described herein, i.e. a connection or coupling without additional intervening elements, may also be replaced by an indirect connection or coupling, i.e. a connection or coupling with one or more intervening elements, or vice versa, as long as the general function of the connection or coupling, for example to transmit a certain kind of signal or information or cause a certain reaction, is essentially maintained. Connections may be wire-based connections or wireless connections unless noted otherwise, although in many implementations current or charges may be transmitted via wire-based connections.

In some embodiments, a load having an inrush-current behavior may be supplied via a first load path comprising a first switch and a second load path comprising a second switch. The first and second switches may be opened and closed in an alternating manner, in some embodiments with some overlap. In some embodiments, the first and second switches may be MOSFET switches operated in saturation when closed. A frequency of a switching between the first load path and the second load path may be selected depending on thermal stability of the first and second switches to avoid thermal overload.

An inrush-current behavior in the context of this application may refer to a behavior where at a beginning of supplying current (also referred to as charging herein) the load exhibits a low impedance (e.g. 10 Ohm or below or 1 Ohm or below), whereas after some time the resistance increases. After some time, a time dependence of the impedance may be zero or effectively close to zero; this is typically referred to as having reached a steady state. In the steady state, the current may reach a steady-state value. E.g., an inrush-current behavior in the context of this application may refer to a behavior where a peak value of the load current during charging amounts to more than 1.5-times or 2-times or 2.5-times or 10-times of the steady-state value of the load current.

Inrush-current behavior may be present for capacitive elements. Here, the load paths may serve for charging purposes of the capacitive elements.

A specific example is the charging of a capacitance which until charged has a comparably low ohmic resistance for DC currents, whereas when charged has a very high ohmic resistance (essentially infinity apart from leakage currents) in the steady state. Another example is a filament of a light bulb, which when being switched on is cool and therefore may have a very low resistance, but when heated by a supply current then has a significantly higher resistance.

Turning now to the figures, FIG. 1 is a schematic block diagram illustrating a device according to an embodiment.

The device of FIG. 1 includes a load 11 having an inrush-current behavior to be supplied by a power source 10. Load 11 may for example include a capacitance, which may be formed by one or more capacitors for example of a load to be powered by power source 10, for example an electronic circuit to be powered by power source 10. Load 11 may also include a wire like a filament of a light bulb. Power source 10 may be any suitable power source, for example a battery in a mobile application, a mains adaptor or the like.

When switching on the device of FIG. 11, as explained above load 11 for a certain time (e.g. until charged or heated, e.g., until the steady state is reached). In particular, simply connecting load 11 to power source 10 in such a state could lead to high current, which in turn may for example cause overheating of devices.

In the device of FIG. 1, load 11 may be supplied via a first load path 15 comprising a first switch 13 and/or via a second load path 16 comprising a second switch 14. First and second switches 13, 14 may be switches which in a closed state conduct current up to a certain saturation current and therefore may have a current limiting property. For example, switches 13, 14 may be MOSFET switches (metal oxide semiconductor field effect transistor) or similar transistor-based switches operated in a saturation region.

A controller 12 is provided controlling opening and closing of first and second switches 13, 14. Controller 12 may be implemented e.g. in hardware, software, firmware or combinations thereof. E.g. controller 12 may include a processor which is programmed to control switches 13, 14 accordingly, or may include hard wired logic and/or an application specific integrated circuit (ASIC) to control switches 13, 14. In embodiments, controller 12 is adapted to close switches 13, 14 in an alternating manner, such that load 11 is supplied alternatingly via first load path 15 and second load path 16. In some embodiments, a switching frequency for switching between load paths 15, 16 is selected such that overheating or other undesired operation of switches 13, 14 is prevented. The exact switching frequency or switching time may depend on the technology used to implements switches 13, 14 and may for example be determined by experimental characterisation of switches 13, 14, for example by applying a current to a switch of a type corresponding to a type of switch 13 and/or 14 for various time durations to determine which time durations e.g. have a sufficiently low danger of thermal damage to the switch.

In some embodiments, in this way the supply current to load 11 may be kept essentially constant until load 11 reaches a state with a higher resistance, e.g. is charged in case of a capacitance or is heated in case of a filament of a light bulb. After this stage, one or both of switches 13, 14 may remain closed to supply power to a circuit or device comprising load 11 in normal operation. In some embodiments, a saturation current may be selected such that a stress for the respective switch 13, 14 (for example due to temperature changes) is minimized. This supplying as described above may be used at start-up as mentioned, but may also be activated manually by a user in some embodiments, via a pin of a chip via which for example switches 13, 14 may be controlled.

In some embodiments, the alternate switching is performed with a slight overlap to avoid a state where both switches 13, 14 are open at the same time. This may, for example, be advantageous with respect to noise and/or power dissipation in a system. In other embodiments, gaps may be provided to provide a state where both switches 13, 14 are open at the same time between the alternate closing of switches 13, 14. In some embodiments, this may help to reduce a load for power source 10.

Next, with reference to FIGS. 2 to 8 various further embodiments will be illustrated and described. For ease of description, in these embodiments a capacitive load is used as example for a load having an inrush-current behavior. However, it is to be understood that the techniques and devices of FIGS. 2 to 8 may also be applied to other loads having an inrush-current behavior, for example to filaments of light bulbs.

Figure 2:
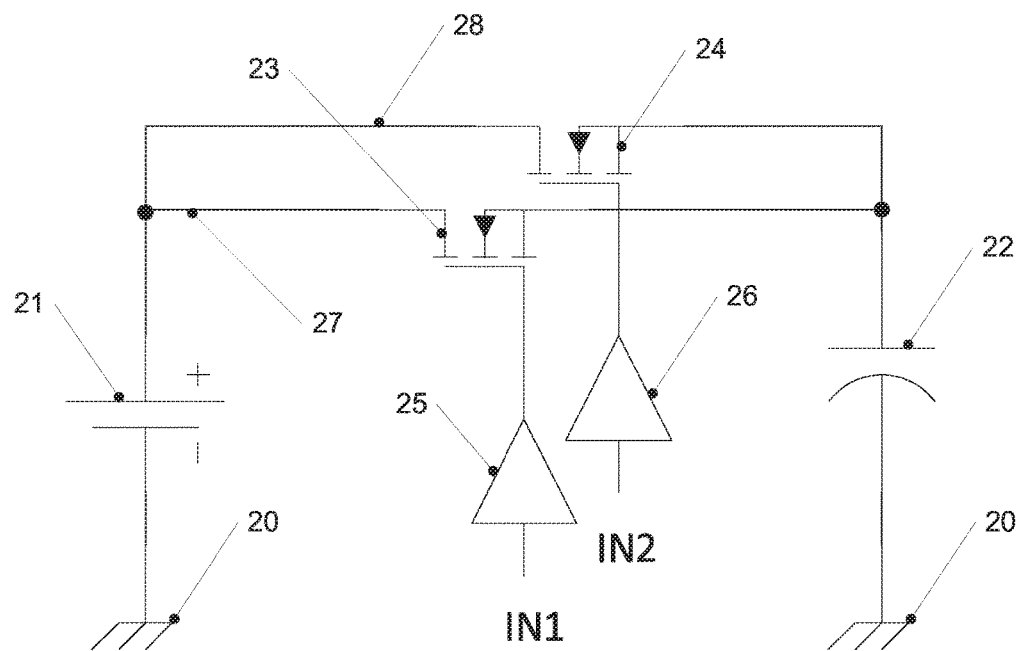
FIG. 2 is a schematic circuit diagram illustrating an embodiment.
Figure 3:
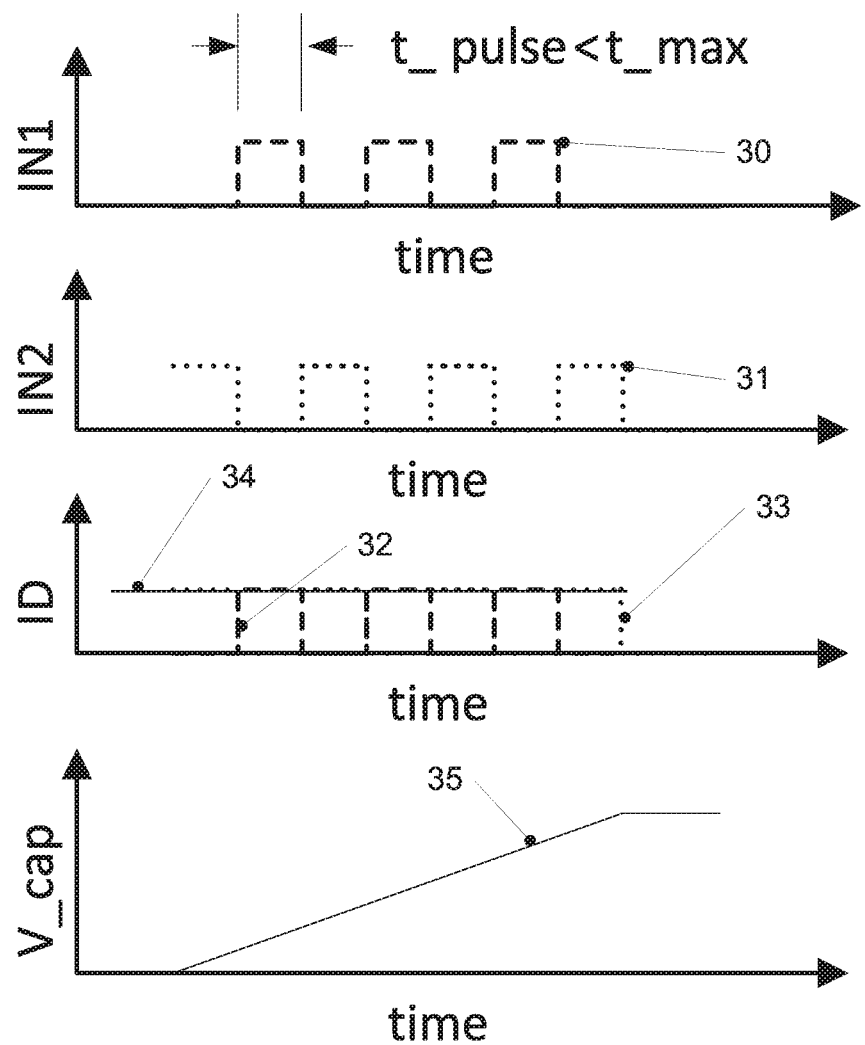
FIG. 3 is a diagram schematically showing various example signals for the embodiment of FIG. 2.

FIG. 2 is a circuit diagram illustrating a device according to an embodiment. FIG. 3 is a diagram showing example signals for the device of FIG. 2. However, the example signals of FIG. 3 are only a schematic example, and depending on the implementation signal waveforms may differ.

In FIG. 2, a capacitor 22 may be charged by a battery 21 via a first load path 27 and/or a second load path 28. Numeral 20 denotes ground. Battery 21 is merely an example for any suitable kind of power source. Capacitor 22 may be representative of one or more capacitors, including for example parasitic capacitors in circuits.

First load path 27 includes a first MOS transistor 23 which is controlled by a first control signal IM via a first buffer 25. First MOS transistor 23 acts as a first switch for switching first load path 27 on and off. Furthermore, second load path 28 includes a second MOS transistor 24 which is controlled by a second control signal IN2 via a second buffer 26. Second MOS transistor 24 acts as a second switch for switching the second load path 28 on and off. In this respect, an on state (or closed state) refers to a state where current may flow via the respective load path or switch at least up to a maximum current determined e.g. by a saturation current of a switch, whereas an off state (or open state) refers to a state where essentially no current (apart from e.g. unwanted leakage currents) may flow via the load path or switch.

Operation of the circuit of FIG. 2 will now be explained using example signals shown in FIG. 3. These signals are provided only for illustration purposes and are not to be construed as limiting. A curve 30 in FIG. 3 illustrates an example for first control signal IM. A curve 31 illustrates an example for second control signal IN2. Both IM and IN2 in the example shown are pulsed signals which alternatingly close first MOS transistor 23 and second MOS transistor 24. A pulse width t_pulse of IM and IN2 in embodiments is selected to be smaller than a maximum value t_max. t_max may for example be determined depending on an implementation of MOS transistors 23, 24 such that for pulse times smaller than t_max MOS transistors 23, 24 may be operated in a safe operation area (SOA). E.g. when operating in this area a damage of MOS transistors 23, 24 due to thermal stress like over temperature or other adverse effects are avoided. The control signals IN1, IN2 may be selected such (e.g. the voltage of IN1, IN2 in an on state) that in the on state the transistors 23, 24 operate in a saturation region. The saturation current of the transistors 23, 24 then effectively constitutes a current limit limiting the load current to capacitor 22. A curve 32 schematically illustrates the current via the first load path 27 (i.e. due to the switching by signal IN1), and a curve 33 illustrates the current via the second load path 28 (i.e. due to the switching by signal IN2). A solid line 34 shows the overall current which is essentially constant. As will be explained later with reference to FIGS. 6 and 7, in some embodiments some overlap may be between the on times of signals IN1, IN2, such that it is ensured that at least one of transistors 23, 24 is always on, and the current never drops to 0. This may reduce current transients and voltage edges which in turn may help to limit power dissipation and limit disturbances in the current supply in some embodiments. In this case, small spikes may occur an overall current 34 during the "overlap" between the on states of transistors 23, 24. In other embodiments, gaps may be provided where both transistors 23, 24 are off between the individual turning on of the transistors 23, 24.

A curve 35 shows an example for the voltage at capacitor 22 over time. Due to the constant load current (curve 34), the voltage at the capacitor 22 increases essentially linearly until the charging is complete at which time the voltage becomes constant and a steady state has been reached.

Figure 4:
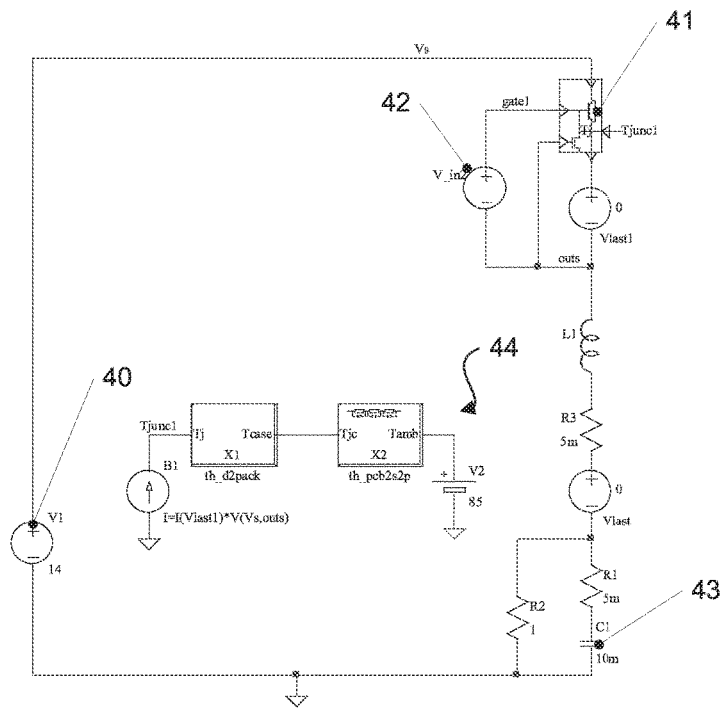
FIG. 4 shows a simulation circuit of a comparative example.

To illustrate the effect of some embodiments further, next simulations of a comparative example and an embodiment will be described with reference to FIGS. 4 to 7. FIG. 4 illustrates a simulation environment of a comparative example using a single load path with a single transistor 41 which is controlled by a control voltage 42 at its gate. A power source 40 is used for charging a capacitor 43 via transistor 41. Numeral 44 designates a simulation environment for determining the temperature.

Transistor 41 in the simulation example of FIG. 4 is a MOSFET with an area of 24 mm², and a capacitance of capacitor 34 is 10 mF. As can be seen, in the example of FIG. 4 capacitor 34 is provided together with other circuit elements like resistors and an inductor.

For charging transistor 43, MOSFET 41 is operated in a saturation region to limit the current.

Figure 5:
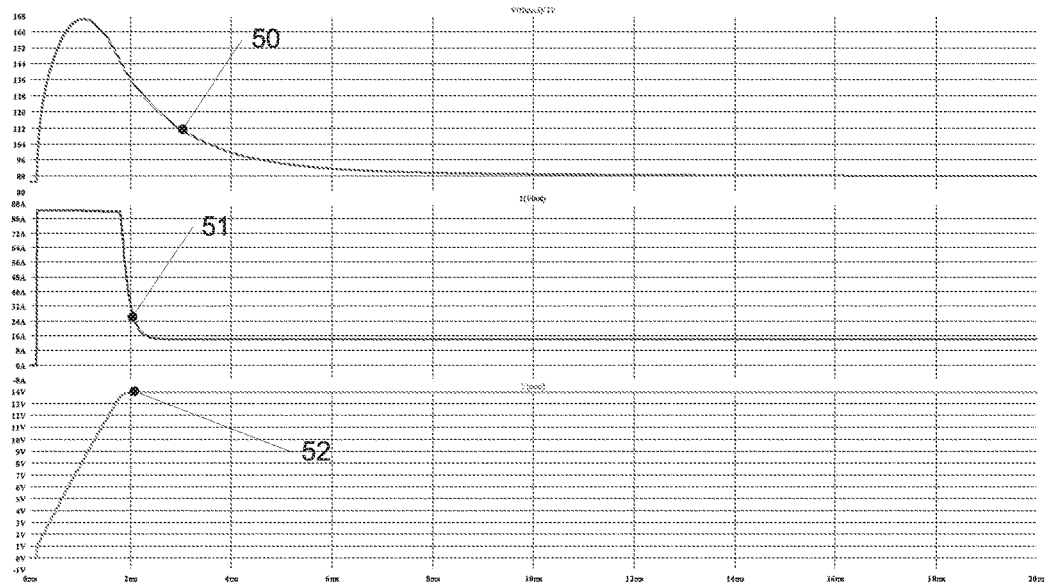
FIG. 5 shows simulation results for a comparative example.

FIG. 5 illustrates simulation results for the simulation environment of FIG. 4. A curve 50 shows the temperature at a junction of transistor 41, a curve 51 illustrates the load current and a curve 42 illustrates the voltage at capacitor 43. As can be seen, the load current is limited to about 85 A. The temperature rises by about 80 K up to about 168 K. A possibility to reduce this temperature rise could be to limit the current (e.g. by controlling a gate voltage of transistor 41 accordingly). However, this may lead to transistor 41 operating in a thermal instable region and to elongate charge duration which could also adversely influence or even destroy transistor 41.

Figure 6:
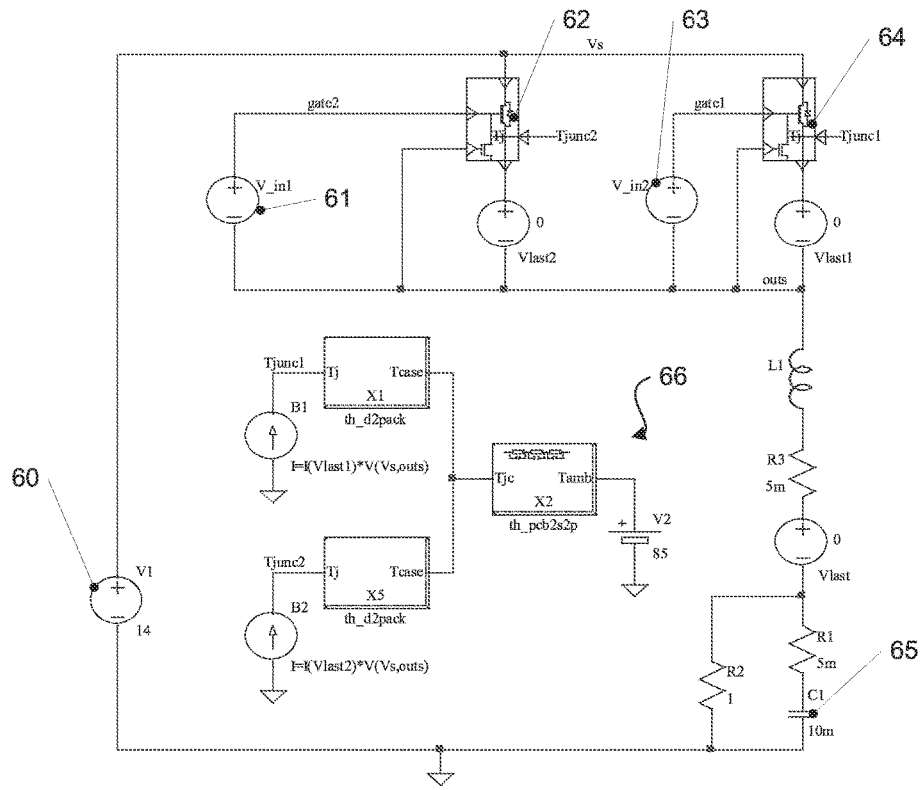
FIG. 6 shows a simulation circuit for simulating an embodiment.

FIG. 6 illustrates a simulation environment for simulating a device according to an embodiment. In the simulation environment of FIG. 6, two load paths are provided, one via a first transistor 62 and one via a second transistor 64. First transistor 62 is controlled by a first gate voltage source 61, and second transistor 64 is controlled via a second gate voltage source 63. Each of transistors 62, 64 in the simulation example are transistors having an active area of 12 mm² each, such that the overall active area is the same for the simulation environments of FIGS. 4 and 6 (one transistor with 24 mm² in FIG. 4 and two transistors with 12 mm² area each in FIG. 6). In the simulation environment of FIG. 6, a capacitor 65 is charged by a power source 60. Capacitor 65, similar to capacitor 43 in FIG. 4, for simulation purposes is a 10 mF capacitor. Numeral 66 denotes a simulation environment for the temperature of transistors 62, 64.

Figure 7:
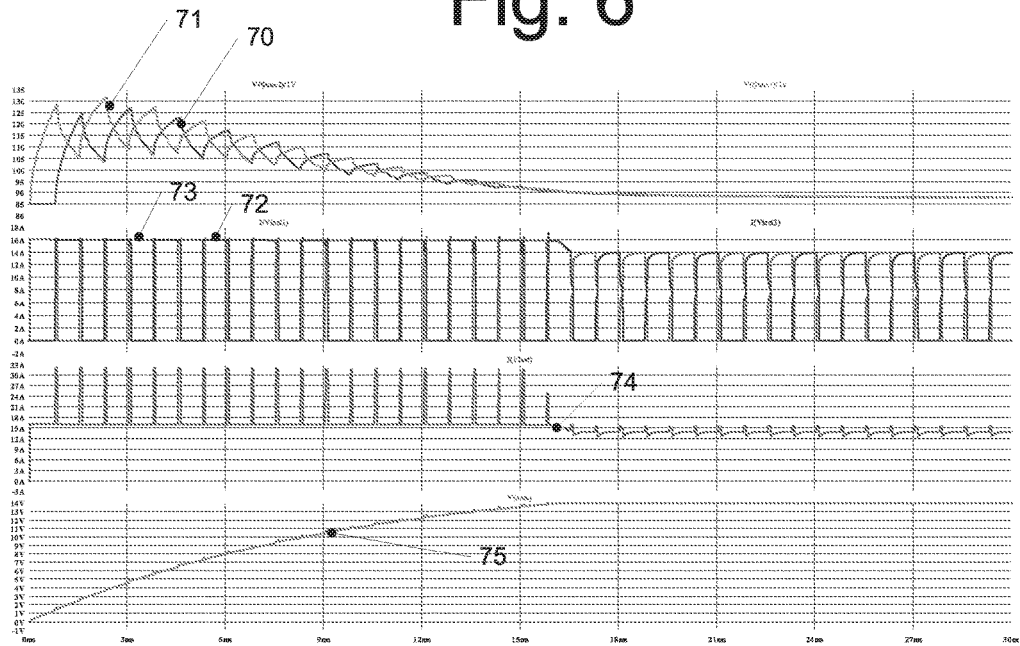
FIG. 7 shows simulation results for the circuit of FIG. 6.

FIG. 7 shows simulation results for the simulation environment of FIG. 6. Curves 70 and 71 show temperatures for transistors 62 and 64, respectively. Curves 72, 73 show charge currents via first and second transistor 62, 64, respectively. A curve 74 shows an overall current. A curve 75 shows a voltage at capacitor 65.

In the simulation example of FIGS. 6 and 7, transistors 62, 64 were controlled to be opened and closed in an alternating manner with some overlap, such that for a short time with each switching between the load paths both transistors 62, 64 are on. This may be seen in a slight overlap between curve 72 and 73 and small spikes in curve 74. As already discussed, this prevents the load current from dropping to 0 which may reduce current transients and voltage edges and reduce power dissipation which otherwise may e.g. lead to a faster aging of components. As already mentioned, in other embodiments transistors 62, 64 may be controlled to be opened and closed in an alternating manner such that "gaps" where both transistors 62, 64 are open may be provided between the alternate closing of transistors 62, 64. Such an embodiment may reduce a load on a power source used. Therefore, the switching scheme may be selected depending on an application and components used.

Furthermore, as can be seen from curves 70 and 71, the maximum temperature is decreased to about 130° C. which corresponds to a temperature difference of about 45 K compared to the temperature difference of 80 K for curve 50. Therefore, the temperature difference may be reduced without operating the transistors in the saturation range for a long time. This may make better use of the thermal coupling of the transistors.

As can be seen, compared to FIG. 5 in FIG. 7 the currents are lower and the charging time is longer. This is because with the switching scheme of FIG. 7, it is possible to operate transistors 62, 64 in a safe operation area (SOA) in saturation with the comparatively low currents, as the on-times for transistors 62, 64 may be essentially freely selected (via adjusting the switching frequency accordingly). In contrast, in FIG. 5 the current has to be selected quite high to be able to fully charge the capacitor while operating transistor 41 in saturation and while still being in the SOA of transistor 41.

It should be noted that the simulation examples of FIGS. 4 to 7 are provided merely to better illustrate some features of some embodiments and are not to be construed as limiting. In particular, dimensions given like areas of transistors may be different in other implementations, and signal waveforms may differ from the simulated waveforms shown for illustration purposes.

Figure 8:
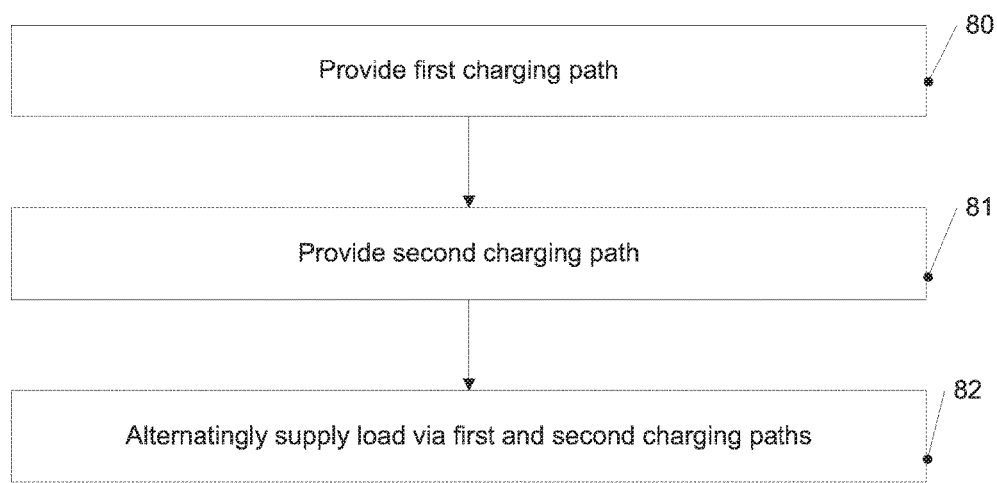
FIG. 8 illustrates a flow chart of a method according to an embodiment.

FIG. 8 illustrates a method according to an embodiment. The method of FIG. 8 may be implemented using the embodiments described above with reference to FIGS. 1 to 7, and details, variations and modifications discussed with respect to the devices of FIGS. 1 to 7 may also be applied to the method of FIG. 8. However, use of the method of FIG. 8 is not limited to the devices shown in FIGS. 1 to 7. While the method of FIG. 8 is described and illustrated as a series of acts or events, the order in which these acts or events are described is not to be construed as limiting, and in other embodiments other orders may be used, or various acts or events may be performed simultaneously.

At 80, the method includes providing a first load path for supplying a load having an inrush-current behavior, e.g. a capacitance. The first load path may e.g. include a first switch like switch 13 of FIG. 1 or switch 24 of FIG. 2. At 81, the method includes providing a second load path for supplying the load. The second load path may include a second switch like switch 14 of FIG. 1 or switch 23 of FIG. 2. At 82, the method includes supplying the load alternatingly via the first and second load paths, e.g. by alternatingly switching the first and second switches on and off. This may be done as explained previously, e.g. in an overlapping manner to ensure that always at least one of the load paths is on, or with gaps therebetween. The load may e.g. be formed by one or more capacitors possibly including parasitic capacitors or by a filament of a light bulb.

It should be noted that while embodiments with two load paths were described, also more than two load paths may be provided. Also, while some embodiments where shown as high-side switches coupled between a positive supply voltage and a load, techniques disclosed herein may also be applied to low-side switches, e.g. between a negative supply voltage or ground and a load. The above described embodiments are to be seen as illustrative only and are not to be construed as limiting in any way.

What is claimed is:

1. A device, comprising:
   a first load path configured to be connected between a power supply terminal and a load having an inrush-current behavior, the first load path comprising a first switch,
   a second load path configured to be connected between the power supply terminal and the load, the second load path comprising a second switch, and
   a controller configured to alternatingly activate the first switch and the second switch over a plurality of alternating cycles to supply the load during a start-up of the device, wherein alternatingly activating the first switch and the second switch comprises opening and closing the first switch and the second switch.

2. The device of claim 1, wherein the controller is configured to operate the first switch and the second switch in a saturation region in an on state of the first switch and the second switch, respectively.

3. The device of claim 1, wherein at least one of the first switch or the second switch comprises a field effect transistor (FET) switch.

4. The device of claim 3, wherein the FET switch comprises a metal oxide semiconductor FET.

5. The device of claim 1, further comprising a power supply coupled to the power supply terminal.

6. The device of claim 1, further comprising the load, the load comprising at least one of a capacitance or a filament.

7. The device of claim 6, wherein the capacitance comprises at least one of a capacitor or a parasitic capacitance of a device to be supplied by a power supply coupled to the power supply terminal.

8. The device of claim 1, wherein the controller is configured to control the alternatingly activating of the first switch and the second switch such that closed phases of the first switch and the second switch overlap.

9. The device of claim 1, wherein the controller is configured to control the alternatingly activating of the first switch and the second switch such that closed phases of the first switch and the second switch are separated by a gap where both the first switch and the second switch are open.

10. The device of claim 1, wherein a time duration of on states of the first switch and the second switch is determined based on a thermal stability of the first switch and the second switch.

11. A device, comprising:
    a power source,
    at least one load having an inrush-current behavior,
    a first metal oxide semiconductor field effect transistor (MOSFET) coupled between the power source and the at least one load,
    a second MOSFET coupled in parallel to the first MOSFET between the power source and the at least one load, and
    a controller configured to apply signals to gate terminals of the first MOSFET and the second MOSFET to alternatingly activate the first MOSFET and the second MOSFET over a plurality of alternating cycles during a start-up of the device, wherein alternatingly activating the first MOSFET and the second MOSFET comprises turning on and off the first MOSFET and the second MOSFET.

12. The device of claim 11, wherein the first MOSFET and the second MOSFET are operable in a saturation region to limit a load current.

13. The device of claim 11, wherein the controller is configured to control the first MOSFET and the second MOSFET such that on states of the first MOSFET and the second MOSFET overlap.

14. A method, comprising:
    providing a first load path between a power supply and at least one load having an inrush-current behavior,
    providing a second load path between the power supply and the at least one load, and
    starting up the at least one load, wherein starting up the at least one load comprises alternatingly supplying the at least one load via the first load path and the second load path over a plurality of alternating cycles.

15. The method of claim 14, wherein the alternatingly supplying the at least one load comprises opening and closing a first switch in the first load path and a second switch in the second load path.

16. The method of claim 15, wherein the opening and closing the first switch and the second switch comprises controlling the first switch and the second switch such that closed phases of the first switch and the second switch overlap.

17. The method of claim 15, wherein the opening and closing the first switch and the second switch comprises closing the first switch and the second switch such that the first switch and the second switch operate in a saturation region.

18. The method of claim 15, wherein the first switch and the second switch comprise field effect transistor (FET) switches, and the alternatingly opening and closing the first switch and the second switch comprises applying pulsed signals to gate terminals of the first switch and the second switch.

19. The method of claim 18, wherein the pulsed signals have pulse lengths smaller than a maximum length determined by a thermal stability of the FET switches.

* * * * *